United States Patent Office 3,383,348
Patented May 14, 1968

3,383,348
COATING COMPOSITIONS CONTAINING WAX AND ETHYLENE-VINYL CYCLOHEXANE COPOLYMER
Michael H. Grasley, Walnut Creek, Calif., assignor to Shell Oil Company, New York, N.Y., a corporation of Delaware
No Drawing. Filed Dec. 22, 1964, Ser. No. 420,433
1 Claim. (Cl. 260—28.5)

ABSTRACT OF THE DISCLOSURE

Coating composition containing petroleum wax and a copolymer of ethylene and vinyl cyclohexane having 80–90 mole percent ethylene monomer units.

---

This invention relates to coating compositions and particularly to wax-extended polymeric coatings.

Petroleum-derived waxes have been used for many years to coat paper and carton boards especially for use in wrapping and containing dairy products and other food products such as bakery goods as well as for coating cloth, fibers, and food products including cheese and meats to render them moisture-vapor resistant. Such waxes, however, have had an unfortunate tendency to crack and peel off the coated articles, especially when they are subjected to repeated flexing or severe creasing. Even waxes modified with polyethylene, while having some improved properties, show disadvantages relative to brittleness and lack of tensile strength particularly under low-temperature conditions.

In the last few years, the disadvantages which are normally attendant to the use of wax in coating applications have resulted in the significant supplanting of wax alone by the use of polymeric coatings, polyethylene and polypropylene in particular. However, despite the wide use of polymer-coated paper for a wide variety of packaging uses, such laminates have not been a panacea since they too lack the desired resistance to penetration by oxygen, grease, organic vapors and water vapors. In addition, polyethylene coatings have not been found to possess the desired amount of resistance to abrasion and flexing. Polypropylene coatings, while superior to polyethylene in some respects, are deficient in that they lack the rigidity of wax inpractical thicknesses. As a result there has been considerable interest in the incorporation of polymeric materials into wax for the purpose of benefitting from the most desirable properties of both. Thus, polymers such as ethylene-propylene copolymer, ethylene-vinyl acetate copolymer, ethylene-vinyl acrylate copolymer, various synthetic rubbers and the like have all been proposed for incorporation into wax.

Each of the above-mentioned copolymers which has been suggested for incorporation into wax can be characterized as consisting of a long polyethylenic chain backbone containing randomly distributed side chains or substituents. These substituents have invariably been of linear nature such as alkyl, carboxyl, carboxylic acid esters and the like. While the mechanism by which such copolymers interact with wax is not known, it has been theorized that the interaction is based on the presence of occasional side chains since similar interactions, especially of wax reinforcement, are not obtained in the same manner or degree with unbranched or regularly branched polymers such as polyethylene, polypropylene, polybutadiene, polyvinyl chloride and polyvinyl acetate.

However, it has now been discovered that wax-copolymer compositions, having substantial polymer-like properties, can be prepared using copolymers which have a continuous polyethylenic backbone but which have cyclic group interruptions along the polymer chain. In particular, the invention relates to wax compositions containing reinforcing amounts of ring-branched copolymers, that is, ethylenic copolymers having randomly periodic cycloalkyl chain interruptions. Still more particularly, the invention lies in the discovery of wax compositions containing reinforcing amounts of a copolymer corresponding to the general linear configuration

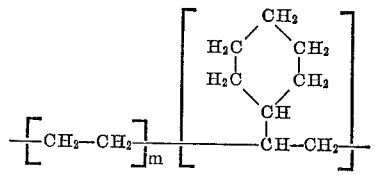

in which $m$ is an average integer ranging from about 4 to 9, the copolymer having an intrinsic viscosity, measured in decalin at 150° C., of from 2 to 8.

Copolymers of the above configuration can be synthesized by reaction of ethylene and vinyl cyclohexane in the presence of the preformed Ziegler-type catalyst $Al(C_2H_5)_3/TiCl_3$. A catalyst of this type is described detailedly in U.S. Patent 3,141,872, issued July 21, 1964. Still another Ziegler-type catalyst is $Al(C_6H_{13})_3/VCl_4$. The copolymerization is carried out in the presence of an inert hydrocarbon solvent such as heptane under moderate heating conditions such as 30–60° C. Reaction times of from 20 to 180 minutes are typical for copolymerization reactions of this nature.

The copolymers of this type which are useful in the compositions of the invention have an average molecular weight of at least 100,000 and have intrinsic viscosities of from about 2 to 8. Copolymers below I.V. 2 have drastically reduced wax-reinforcing properties, while those above I.V. 8 have insufficient liquid phase compatibility with wax to be practicable wax additives.

It is also preferred that the copolymers of the invention contain at least 80 but not more than about 90 mole percent ethylenic monomeric units. As in the case of intrinsic viscosities below 2, it is important that the mole percent of ethylene in the copolymers of the invention not be below about 80% since, below that amount, the copolymers have greatly reduced capability of reinforcing wax to give polymer-like properties.

It is likewise important to this application of the copolymers that they be of an essentially unblocked character. That is, the distribution of the chain-substituted rings along the entire polymer chain should be of a random nature in which the rings are present in single units and not blocks of two or more. To this end, it is important during the preparation of these polymers that the dispersion of the comonomers in the polymerization solution be quite thorough. When polymers of a blocked character are formed, the reinforcing properties of the polymer are so reduced as to make the copolymer substantially ineffective for the compositions of the invention.

The waxes which may be used in accordance with the invention, and which are preferred, are petroleum waxes derived from the refining of waxy lubricating oil base stocks. By the term "distillate wax" is meant those waxes which are derived from the refining of distillate lubricating oils, while the term "residual wax" refers to those waxes which are removed during refining of residual lubricating oils such as bright stock. The distillate waxes are generally paraffinic in nature, the ratio of normal-to-isoparaffins in which is inversely related to their molecular weight. The residual waxes, on the other hand, may contain microcrystalline wax or high-melting-point paraffins or both. Virtually all residual waxes are constituted of a mixture of both microcrystalline (amorphous) and paraffinic waxes; however such waxes can be further refined (split) to produce separate wax fractions which are essentially microcrystalline and essentially paraffinic (crystalline) in character. To be used in the coating compositions of the invention, the waxes must be rather highly refined, i.e., they should contain no more than about 2.0% by weight oil and preferably 1.0% by weight or less.

Properties of typical petroleum waxes which can be used in the composition of the invention either by themselves or various mixtures are given in the following table:

TABLE I.—NEAT PETROLEUM WAX PROPERTIES

| Type of Wax | Melting Point, °F. | Carbon Number | Percent n-Paraffins | Tensile Strength at 77° F. |
|---|---|---|---|---|
| A. Isoparaffinic distillate wax | 110-112 | 21-36 | 28 | |
| B. Paraffinic distallate wax | 125-127 | 20-30 | 94 | 263 |
| C. Paraffinic distillate wax | 138-140 | 22-36 | 80 | 350 |
| D. Paraffinic/soparaffinic heavy distillate wax | 158-162 | 24-45 | 52 | 186 |
| E. Bright stock (residual) wax | 176 | 28-60 | 25 | |
| F. Amorphous (microcrystalline) wax | 137-142 | 28-60 | 12 | |
| G. High-melting point residual paraffinic wax | 180-182 | 30-60 | 45 | 245 |

The compositions of the invention therefore consist of wax, preferably petroleum wax, and sufficient amounts of the above-discussed copolymer to reinforce the wax and give the composition polymer-like properties. More particularly, the compositions of the invention consist of 95–40% by weight wax and 5–60% by weight of the copolymer as defined hereinabove. At least about 5% by weight copolymer is required to give any substantial degree of wax reinforcement. On the other hand, above about 60% by weight copolymer, the economic advantage of small amounts of wax is lost and the beneficial properties of the wax, e.g. water-vapor impermeability, are so diluted as to be negligible.

The invention will be more readily understood by reference to the following examples:

Example I

A series of ethylene-vinyl cyclohexane copolymers was prepared by addition of ethylene to a solution of vinylcyclohexane in cyclohexane containing also a small amount of $VCl_4/Al(C_2H_5)_3$ catalyst. The ethylene addition was carried out over a period of 120 to 180 minutes at 17 to 24° C. The properties of the copolymers thusly prepared are given below. For comparison, the properties of a linear polyethylene are also given.

TABLE II.—PROPERTIES OF NEAT ETHYLENE-VINYL CYCLOHEXANE COPOLYMERS

| No. | Mole Percent Ethylene | Intrinsic Viscosity (dl./gram) | Yield Point (p.s.i.) | Tensile Strength (p.s.i.) | Elongation at Break (Percent) |
|---|---|---|---|---|---|
| 1 | 89 | 4.8 | 4,500 | 1,050 | 550 |
| 2 | 92 | 5.2 | 3,750 | 1,410 | 570 |
| 3 | 93 | 3.4 | 3,200 | 2,350 | 575 |
| 4 | 96 | 7.1 | 5,550 | 1,850 | 634 |
| 5 | 96 | 8.3 | 4,750 | 1,720 | 468 |
| Linear polyethylene | 100 | 3.4 | 4,930 | 2,760 | 195 |

Example II

Each of the above-listed copolymers, as well as the polyethylene, was then admixed with 30% by weight of high-melting-point residual wax in the molten state, cooled, and the strength properties of the wax-polymer composition were determined. The properties of the residual paraffinic wax were the same as those given in the last line of Table I. The properties of the 70/30 wax/polymer compositions were as follows:

TABLE III.—PROPERTIES OF 70/30 WAX-ETHYLENE-VINYL CYCLOHEXANE COPOLYMER COMPOSITIONS

| | Copolymer | | Wax/Copolymer Composition | | |
|---|---|---|---|---|---|
| No. | Mole Percent Ethylene | Intrinsic Viscosity (dl/gram) | Yield Point (p.s.i.) | Tensile Strength (p.s.i.) | Elongation at Break (Percent) |
| Neat wax | | | | 245 | 0 |
| 1 | 89 | 4.8 | 1,000 | 1,390 | 380 |
| 2 | 92 | 5.2 | 880 | 1,480 | 35 |
| 3 | 93 | 3.4 | | 1,550 | 6 |
| 4 | 96 | 7.1 | | 1,300 | 9 |
| 5 | 96 | 8.3 | 1,240 | 1,240 | 0 |
| Linear polyethylene | 100 | 3.4 | 1,800 | 1,800 | 32 |

The foregoing data show that linear polyethylene was essentially completely ineffective in increasing the elongation at break of the wax. Likewise, regardless of the intrinsic viscosity of the copolymer, all of the copolymers containing more than about 90 mole percent ethylene monomeric units were incapable of imparting elongation properties to the wax. However, the copolymer containing 89 mole percent ethylene produced a wax-copolymer composition of 380% elongation. From this, it is apparent that substantial wax reinforcement to obtain plastic-like properties, including substantial elongations, is possible only within the quite narrow range of 80 to 90 mole percent ethylene, and that above this maximum amount, the copolymer so resembles linear polyethylene as to be essentially useless as a wax reinforcing polymer. Or, to put it another way, such high ethylene vinylcyclohexane copolymers are incapable of substantial extension with wax to obtain plastic-like properties.

While it might appear prima facie that all copolymers containing irregularly branched chain substituents would exhibit reinforcing properties of the type shown herein with ethylene-vinyl cyclohexane copolymer, in fact, the configuration of the side chains appears to be quite critical as can be seen from the following example:

Example III

Three series of ethylene-butene copolymers were prepared: ethylene-trans-2-butene, ethylene-cis-2-butene, and ethylene-isobutylene. Each of these series was prepared by addition of ethylene to a hydrocarbon solution of the butene which also contained a small amount of

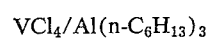

$VCl_4/Al(n-C_6H_{13})_3$ catalyst. The properties of the polymers were as follows:

TABLE IV.—PROPERTIES OF NEAT ETHYLENE-BUTENE COPOLYMERS

| Polymer No. | Mole Percent Ethylene | Butene Comonomer | Intrinsic Viscosity (dl./gram) | Yield Point (p.s.i.) | Yield Strength (p.s.i.) | Elongation at Break (Percent) |
| --- | --- | --- | --- | --- | --- | --- |
| 6 | 92 | Trans-2-butene | 5.0 | 1,700 | 3,640 | 737 |
| 7 | 94 | do | 7.2 | 2,100 | 5,790 | 572 |
| 8 | 95 | do | 5.7 | 1,890 | 3,700 | 580 |
| 9 | 96 | do | 5.0 | 2,200 | 5,340 | 720 |
| 10 | 96 | do | 6.1 | 1,810 | 3,810 | 580 |
| 11 | 97 | do | 5.8 | 2,410 | 5,990 | 682 |
| 12 | 98 | do | 3.3 | 2,570 | 3,560 | 810 |
| 13 | 91 | Cis-2-butene | 7.7 | 1,180 | 2,890 | 540 |
| 14 | 92 | do | 7.8 | 1,420 | 4,240 | 530 |
| 15 | 93 | do | 7.7 | 1,400 | 4,160 | 600 |
| 16 | 94 | do | 6.0 | 1,180 | 4,440 | 640 |
| 17 | 71 | Isobutene | 3.0 | 580 | 790 | 118 |
| 18 | 71 | do | 3.0 | 620 | 780 | 230 |
| 19 | 93 | do | 4.5 | 1,390 | 3,720 | 680 |
| 20 | 97 | do | 4.6 | 1,740 | 4,310 | 636 |

Example IV

Each of the above-listed ethylene-butene copolymers was admixed with 30% by weight of high-melting-point residual wax in the manner described in Example II. Properties of the solid wax-copolymer compositions are given in the following table:

TABLE V.—PROPERTIES OF 70/30 WAX/ETHYLENE-BUTENE COPOLYMER COMPOSITIONS

| Copolymer | | | Wax Copolymer Composition | | | |
| --- | --- | --- | --- | --- | --- | --- |
| Polymer No. | Mole percent Ethylene | Butene Comonomer | Intrinsic Viscosity (dl./gram) | Yield Point (p.s.i.) | Tensile Strength (p.s.i.) | Elongation at Break (percent) |
| 6 | 92 | Trans-2-butene | 5.0 | 1,460 | 1,130 | 0 |
| 7 | 94 | do | 7.2 | 1,710 | 1,020 | 50 |
| 8 | 95 | do | 5.7 | 1,610 | 840 | 0 |
| 9 | 96 | do | 5.0 | 1,670 | 970 | 50 |
| 10 | 96 | do | 6.1 | 1,620 | 1,380 | 20 |
| 11 | 97 | do | 5.8 | 1,740 | 1,080 | 160 |
| 12 | 98 | do | 3.3 | 1,810 | 1,810 | 0 |
| 13 | 91 | Cis-2-butene | 7.7 | 1,420 | 1,420 | 0 |
| 14 | 92 | do | 7.8 | 1,470 | 1,380 | 0 |
| 15 | 93 | do | 7.7 | 1,330 | 870 | 250 |
| 16 | 94 | do | 6.0 | 1,420 | 817 | 150 |
| 17 | 71 | Isobutene | 3.0 | 920 | 920 | 0 |
| 18 | 71 | do | 3.0 | 930 | 930 | 0 |
| 19 | 93 | do | 4.5 | | | 0 |
| 20 | 97 | do | 4.6 | | | 0 |

While three of the above-listed ethylene-butene copolymers gave some elongation to the wax-polymer mixtures, it is evident these types of polymers do not uniformly yield any substantial degree of wax reinforcement. But more importantly, these data indicate that, despite superficial similarities between these copolymers and others which do possess substantial capability of forming polymer-like properties with wax, e.g. ethylene-vinyl cyclohexane, or ethylene-propylene copolymers, the configuration of the chain interruption is quite critical and is not predictable with any great degree of certainty.

Though the illustrations herein have been confined to wax-copolymer compositions in which only one of the copolymers of the invention was used to reinforce the wax, mixtures of the copolymers of the invention with other reinforcing copolymers such as ethylene-higher alpha-olefin copolymers can be used as well as substantially non-reinforcing copolymers such as those having molecular weights of 50,000 and below, e.g. polyethylene, ethylene-vinyl acetatecopolymer, ethylene-ethyl acrylate copolymer, and the like. In addition minor amounts of other additives may be included such as fillers, oxidation inhibitors and gloss stabilizers. Furthermore, the wax component will more often than not be a mixture of petroleum waxes, paraffinic and/or microcrystalline. As an example, a 30–10–30 by weight mixture of waxes C, D and E respectively (see Table I) is an especially desirable blend of waxes to obtain gloss stability in admixture with reinforcing copolymers.

I claim as my invention:

1. A coating composition consisting essentially of 95–40% by weight of petroleum wax and 5–60% by weight of a copolymer of ethylene and vinyl cyclohexane corresponding to the general linear configuration

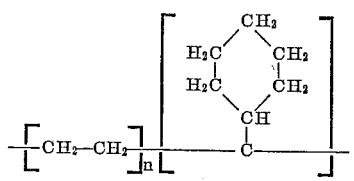

in which $n$ is an average integer from about 4 to about 9, the copolymer containing 80–90 mole percent ethylene monomer units and having an intrinsic viscosity, measured in Decalin at 150° C., of from 2 to 8.

No references cited.

MORRIS LIEBMAN, *Primary Examiner.*

A. AMERNICK, *Assistant Examiner.*

UNITED STATES PATENT OFFICE
CERTIFICATE OF CORRECTION

Patent No. 3,383,348                                              May 14, 1968

Michael H. Grasley

It is hereby certified that error appears in the above numbered patent requiring correction and that the said Letters Patent should read as corrected below.

Column 6, lines 46 to 53, the formula should appear as shown below:

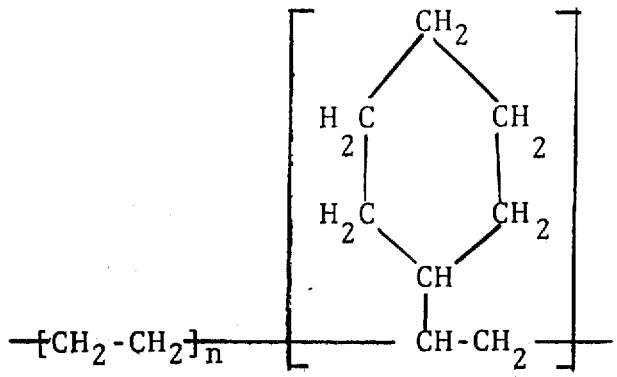

Signed and sealed this 28th day of October 1969.

(SEAL)
Attest:

EDWARD M. FLETCHER, JR.                    WILLIAM E. SCHUYLER, JR.
Attesting Officer                          Commissioner of Patents